United States Patent [19]

Thijssen et al.

[11] Patent Number: 4,666,456
[45] Date of Patent: May 19, 1987

[54] PROCESS FOR THE CONTINUOUS PARTIAL CRYSTALLIZATION AND THE SEPARATION OF A LIQUID MIXTURE

[75] Inventors: Henricus A. C. Thijssen, Son; Gerardus J. Arkenbout, Zeist, both of Netherlands

[73] Assignee: Nederlandse Centrale Organisatie voor Toegepast-Natuurwet Enschappelijk Onderzoek, The Hague, Netherlands

[21] Appl. No.: 456,988

[22] Filed: Jan. 10, 1983

[30] Foreign Application Priority Data

Jan. 11, 1982 [NL] Netherlands .......................... 8200075

[51] Int. Cl.[4] ............................................. B01D 9/02
[52] U.S. Cl. ....................................... 23/296; 23/301; 62/532; 62/541; 260/707; 260/DIG. 35; 585/815
[58] Field of Search ................. 62/532, 541; 422/254, 422/245; 210/DIG. 35, 707; 23/296, 301, 295 R; 585/812, 815

[56] References Cited

U.S. PATENT DOCUMENTS

| 2,848,515 | 8/1958 | Pfennig | 585/815 |
|---|---|---|---|
| 2,931,841 | 4/1960 | De Vault | 585/815 |
| 3,197,524 | 7/1965 | Backlund . | |
| 3,959,978 | 6/1976 | Lindley et al. | 585/815 |
| 4,025,573 | 5/1977 | Hathway | 585/815 |
| 4,331,826 | 5/1982 | Kagawa | 585/812 |
| 4,508,553 | 4/1985 | Thijsson et al. | 62/541 |

FOREIGN PATENT DOCUMENTS

| 1286507 | 1/1969 | Fed. Rep. of Germany . | |
| 2752856 | 5/1979 | Fed. Rep. of Germany | 23/295 R |
| 7002450 | 2/1971 | Netherlands . | |
| 466222 | 1/1969 | Switzerland . | |

OTHER PUBLICATIONS

Mallin, Crystallisation, 1972, pp. 269–271.

Primary Examiner—David L. Lacey

[57] ABSTRACT

Process for continuous crystallization of a liquid mixture in which the mixture is led through a cascade of cooling sections. The temperature in the first section is such that a part of the mixture crystallizes, the temperature in each succeeding section is lower than in the preceding section. The temperature in the last section is such that not the whole of the liquid mixture solidifies. The crystals kept suspended in the liquid are led through the cascade. In one section, not being the last one, the crystal and liquid flow is divided in two flows. One flow mainly formed by the crystals, the other by the liquid. A portion of the divided flow is recycled to the dividing section to keep the crystal volume fraction at a desired value.

7 Claims, 8 Drawing Figures

PRIOR ART

PROCESS FOR THE CONTINUOUS PARTIAL CRYSTALLIZATION AND THE SEPARATION OF A LIQUID MIXTURE

BACKGROUND OF THE INVENTION

The invention relates to a process for the continuous partial crystallization of a liquid mixture, in which this mixture is led in its entirety through a cascade, i.e., a plurality of cooling sections connected in series. The first section of the cascade has a temperature at which a part of the mixture crystallizes and the temperature of each subsequent section is lower than that of the preceding one. The last section has a temperature such that the whole of the liquid mixture is not solidified. The crystals formed in the sections are kept suspended in the liquid and are led through the cascade together with and in the same direction as the liquid.

Furthermore, the invention relates to a process for the separation of a liquid mixture, whereby from this mixture a crystal suspension is produced.

Finally, the invention relates to a device for carrying out the said processes.

By a liquid mixture is meant a mixture which is liquid under operating conditions. It may consist of a number of liquid components, but it may also contain one or more dissolved solid components. The invention is, however, meant in particular for the separation of mixtures of liquid organic compounds, although it is not restricted to such mixtures.

In the process industry the concentration or isolation of one or more components from a liquid mixture plays an important part. A crystallization process can be used for this purpose, the first step of which consists of the partial crystallization of the liquid mixture to be separated. Subsequently, the formed crystals can be separated from the resulting crystal suspension and/or the suspension or crystal mass can be subjected to a further purification treatment.

In the partial crystallization of a liquid mixture it is desirable to obtain relatively pure crystals, i.e., crystals consisting of the component or components to be separated with only a low content of impurities. These crystals must be of such a size that they can easily be separated from a suspension by mechanical means e.g. by filtering, pressing, or centrifuging. Furthermore, rapid growth of the crystals is desired in order to avoid a long residence time and a large, and thus expensive, crystallizer.

When crystals are formed, sponge-like conglomerates of relatively small crystals often develop, which contain liquid impurities as inclusions. When a mixture of substances with related molecular structures, e.g. isomers, is separated, molecules of the one substance can be trapped in crystals of the other substance, resulting in the formation of impure crystals. These phenomena are partially kinetic effects, i.e. they occur in particular at high linear crystallization rates. Furthermore they are promoted by a high concentration of impurities. In order to obtain pure crystals, it is therefore desirable to use low linear crystallization rates and to make the crystallization take place close to equilibrium. If large differences in concentration exist, and more generally under circumstances strongly deviating from equilibrium, strong nucleation takes place, leading to the formation of a large number of very small crystals. In order to prevent nucleation as much as possible, strong supersaturation and/or supercooling are to be avoided.

Purifying crystals by washing with a liquid influences mainly the surface of the cyrstals and has little or no effect on the core. Thus, in the common circumstance where the composition of the crystals is not homogenous, i.e. the concentration of the impurities depends on the location in the crystal, it is recommended that the core be as pure as possible and that any impurities be mainly concentrated on the surface.

It has turned out that the above mentioned requirements can be at least partly met by effecting partial crystallization of a liquid mixture in parallel flow viz. according to the process mentioned in the preamble.

A device for carrying out this process is the cooled disc crystallizer commerically available from Messrs. Stork. This crystallizer consists of an oblong trough which is divided into a plurality of interconnected sections by parallel vertical partitions. These partitions do not span the whole cross section of the trough. On one side of the trough, the liquid mixture to be separated is introduced. It passes successively through all sections leaving the trough on the other side. Each section has a rotating disc ensuring a good stirring and preventing coagulation on the walls. Furthermore, cooling means are present allowing control of the temperature profile over the length of the trough.

The Stork crystallizer provides an acceptable compromise in that it can provide relatively pure crystals of a large and uniform diameter while using a relatively high crystal growth rate. This crystallizer has, however, a serious limitation: crystal suspensions can only be prepared with a maximum crystal volume friction of 0.3–0.4, as suspensions with a higher crystal fraction cannot be effectively stirred and circulated. It is true one could make a Stork crystallizer function in such a way that it yields a crystal suspension with a crystal fraction of e.g. 0.35, which crystal suspension is then led to a mechanical separation device after which the liquid separated in this device is fed to a second Stork-crystallizer. Besides the technical complication, this array has the disadvantage that the liquid adhering to the separated crystals does not participate—at least directly—in the further processing. Also, in the second crystallizer strong nucleation occurs due to the high concentration of the impurities. Because of this, small crystals are formed in the second crystallizer which are not easy to separate.

U.S. Pat. No. 3,197,524 describes a process and device for the recovery and purification of naphthalene by fractional crystallization. The liquid mixture to be separated is led through a cascade of cooling sections; the temperature in each subsequent section is lower than that in the preceding one. The mixture of liquid and crystals leaving the last section is separated in a centrifuge, after which part of the separated liquid is returned to some preceding sections, but not to the last one from which it was removed.

The object of the invention is to provide a process for the continuous partial crystallization in parallel flow of a liquid mixture which process does not show the disadvantages of the known processes.

SUMMARY OF THE INVENTION

The invention is based on the insight that in the known parallel flow crystallization processes, the transport of the liquid and the crystals between the sections of a crystallization cascade is not only in the same direction, but also is coupled, such that the crystal fraction in a section of the crystallizer is determined by the crystallization degree. According to the invention, however, it is possible to effect the transport of the liquid and of the crystals between the sections of a crystallization cascade in the same direction, but uncoupled. In this circumstance, the crystal fraction in a section is no longer exclusively determined by the crystallization degree and it becomes possible to combine any degree of crystallization—both high and low—with a desired crystal volume fraction.

The invention therefore relates to a process for the continuous partial crystallization of a liquid mixture which utilizes a series of progressively colder cooling sections. According to the invention, the flow of liquid and crystals proceeding from at least one section, other than the last section, is divided into two partial flows. One of the partial flows consists entirely or at least substantially of crystals, and the other entirely or at least substantially of liquid. A portion of one of these partial flows is recycled to the section from which the flow was removed in order to keep the volume fraction of the crystals in that section at a desired value. Preferably, the volume fraction of crystals is maintained between 0.15 and 0.40.

Furthermore, the invention relates to a device for carrying out the process according to the invention, consisting of a plurality of reservoirs connected in series, each provided with cooling and stirring means. The first reservoir is provided with a supply line, the last one with a discharge line, and means is provided for material flow passing through all the reservoirs. The outlet opening of at least one reservoir, which is not the last one of the series, is connected with a separating device known per se for separating a crystal suspension into a partial flow substantially consisting of crystals and a partial flow substantially consisting of liquid.

The separation device is provided with two discharge lines, one for removing each partial flow. One discharges into the subsequent reservoir, and the other is split into two branches, one of which discharges into the subsequent reservoir and the other discharging back into the reservoir from which the flow was removed. Thus, according to the invention, a mixture proceeding from a section of the cascade is divided, and at least a part of one of the partial flows is returned to the section from which the mixture proceeds.

BRIEF DESCRIPTION OF THE DRAWINGS

FIG. 3 is a schematic of a technical embodiment of a separation device 3 according to the invention;

DETAILED DESCRIPTION OF THE INVENTION

Figure 1A:
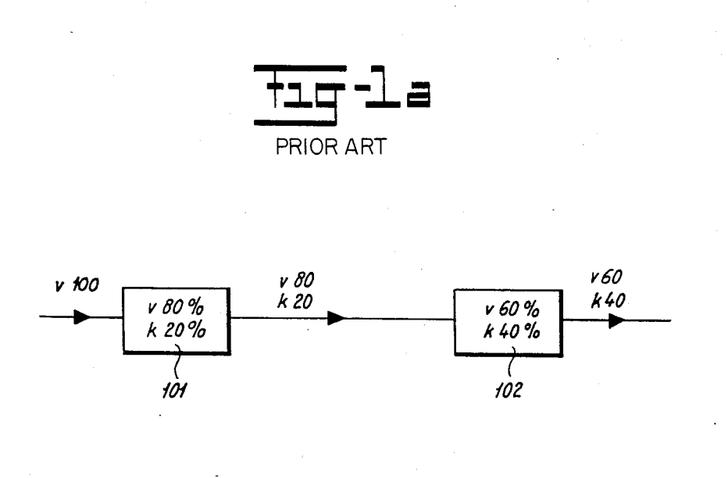
FIG. 1a is a schematic of coupled transport in a parallel flow crystallizer according to the state of the art.

FIG. 1a shows the scheme of a coupled transport in a parallel flow crystallizer according to the state of the art. A flow of 100 parts by volume per hour of the liquid mixture to be separated is fed to the cooling reservoir 101. In this reservoir enough heat is extracted from the mixture such that 20 parts by volume per hour of the mixture will crystallize. The composition of the suspension in reservoir 101 is 80% vol. of liquid and 20% vol. of crystals. 100 parts by volume per hour have to be removed from this reservoir and the flow leaving this reservoir naturally has the same composition as the suspension in the reservoir, so that 80 parts by volume of liquid and 20 parts by volume of crystals per hour are led from reservoir 101 to reservoir 102. In reservoir 102 enough heat is extracted from the suspension contained therein that another 20 parts by volume per hour of crystals are formed. The composition of the suspension in reservoir 102 is 60% of vol. of liquid and 40% vol. of crystals. Such a suspension can be stirred and circulated only with great effort.

Figure 1B:
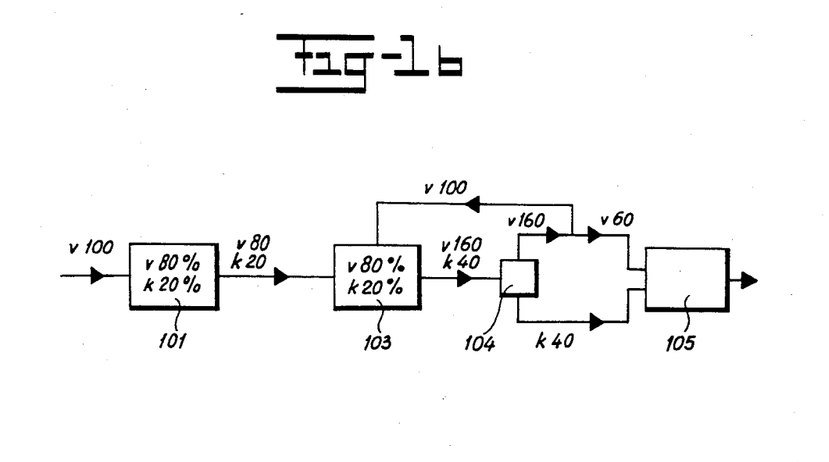
FIG. 1b is a schematic of the uncoupled transport in a cascade crystallizer according to the invention.

FIG. 1b shows the scheme of separated transport in a cascade-crystallizer according to the invention. Again, 100 parts by volume per hour of the liquid mixture to be separated is fed to a cooling reservoir 101 and the situation therein fully corresponds with that according to FIG. 1a discussed above. In reservoir 103, as in reservoir 102 of FIG. 1a enough heat is extracted from the suspension contained therein, that in this reservoir 20 parts by volume of crystals per hour are formed. Reservoir 103 contains, however, a suspension of the same composition as that in reservoir 101, viz. 80% vol. of liquid and 20% vol. of crystals.

To maintain this crystal volume fraction, as many units of crystal per hour have to be discharged from reservoir 103 to reservoir 105 as the sum of the number of parts of crystals supplied to reservoir 103 and the number of parts of crystals formed in reservoir 103 i.e. 20+20=40 parts of volume of crystals per hour. As the composition of the suspension discharged from reservoir 103 is the same as that of the suspension contained therein, together with the 40 parts of crystals 160 parts of liquid are discharged from reservoir 103 per hour. In separator 104 these 40 parts of crystals and 160 parts of liquid are separated, after which the 40 parts of crystals and 60 parts of the separated liquid are fed to the next section 105 and 100 parts of liquid returned to reservoir 103.

The transport of the separated crystals is a forced transport which takes place e.g. by a rotating filter-surface, a scraping device, or a conveyor belt. It is evident that downstream from separator 104 the transport of liquid and the transport of crystals are separated, yet continuing in the same direction. It can also be said that due to uncoupling of the liquid and crystal transports, the residence times of the liquid and of the crystals in a crystallization section are no longer equal: the residence time of the crystals in cooling reservoir 103 is shorter than the residence time of the liquid therein. The result of the process shown schematically in FIG. 1b is that at a total crystallization degree of 40%, the crystal fraction in reservoir 103 amounts to only 0.20, due to which the suspension in this reservoir can still easily be stirred and pumped.

In this regard it must be observed that for simplicity's sake it has been assumed that in separator 104 a complete separation between liquid and crystal mass is effected, which in practice is, of course, not possible.

In order to enhance the purity of the crystals proceeding from the crystallizer, it is advisable to maintain the crystal suspension proceeding from the last section for a period of time in a container where no heat exchange with the surroundings takes place. During this so-called aging, small impure crystals disappear and bigger pure crystals keep growing according to the Gibbs-Thomson-effect. In order to realize this aging, the discharge pipe of the crystallizer is preferably insulated against heat exchange with the surroundings and provided with a stirring device and a discharge pipe.

The crystals in the crystal suspension proceeding from the crystallizer or the aging reservoir respectively can be separated from the liquid as known per se by e.g. pressing, filtering or centrifuging. But often this process is not sufficient to attain the desired purity of a separated component, e.g. a purity of 99.99%. To this end, the crystal suspension or crystal mass produced according to the invention is further purified by contacting it in a known way in counter flow with a liquid. This can be effected in a purification column as e.g. described in Netherlands patent application No. 70,02450 or Swiss patent Ser. No. 466,222. Preferably, in such a column the liquid with which the crystals to be purified are contacted in counter flow, is obtained by melting part of the purified crystals.

It appears that the liquid flowing through the column, with which liquid the crystals are contacted in counter flow at a spot between that where the washing liquid in the form of molten purified crystals is supplied and that where the unpurified crystal suspension is supplied, shows a concentration of the compound to be purified corresponding substantially with that of the original liquid mixture to be separated. It is then advantageous to supply a flow of this original liquid mixture to be separated substantially at that spot as additional washing liquid.

Figure 2:
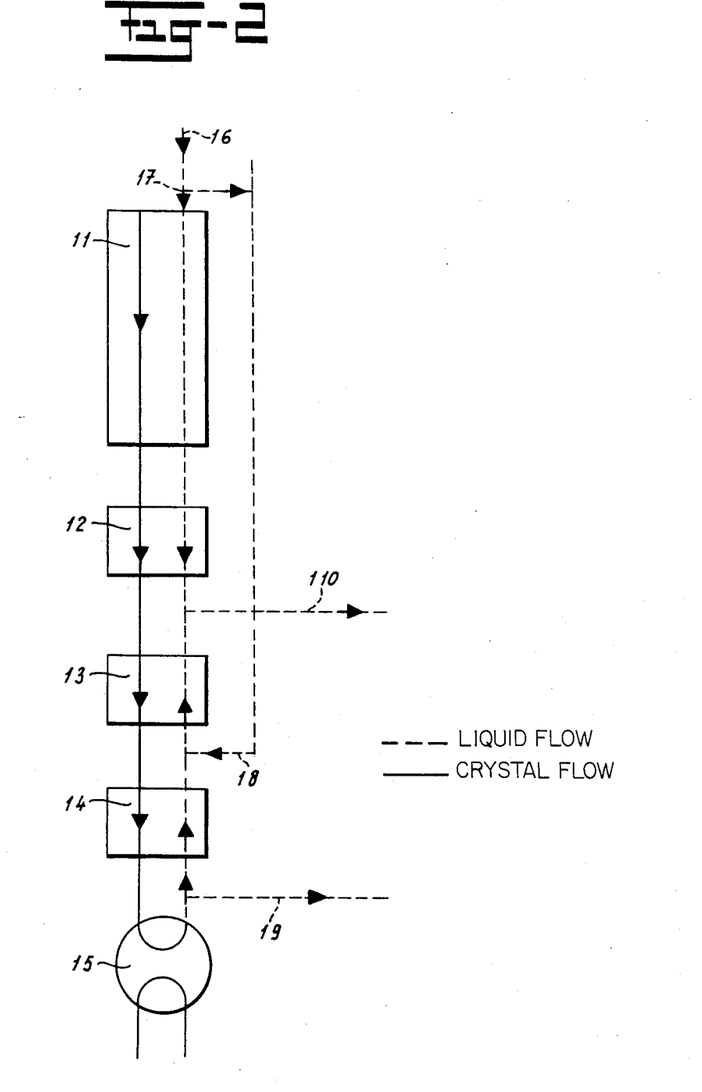
FIG. 2 is a schematic of a separation device according to the invention.

FIG. 2 shows a schematic of a separation device according to the invention with a crystallization cascade 11 in which the transports of liquid and crystals between the section are effected separately by means of transporters, followed by an aging zone 12, a connected pre-purification zone 13, a final purification zone 14, and a melting zone 15.

The mixture to be treated is carried via a line 16, supplied to the crystallization cascade via a line 17 and partially also to the pre-purification zone via a line 18.

The purified product is removed via line 19 in the molten state at the bottom of the final purification zone 14 and the discharge flow at the top of the pre-purification zone 13 via line 110. The dotted line shows the liquid flow and the solid line the crystal current.

The separation device shown schematically in FIG. 3 comprises a cascade of three crystallization sections 21, 22, and 23 for the formation of crystals, an aging tank 24, a column for pre and after purification of crystals 25 and three separators/transporters 26, 27 and 28 for a forced transport of the crystals separated from the transport of the liquid. These transporters are provided with pumps 261, 271 and 281 respectively for the discharge of separated liquid from the transporters.

Each of the crystallization sections 21, 22, and 23 consists preferably of a plurality of externally scraped and internally cooled heat exchangers, which heat exchangers are mounted e.g. in a cylindrical tank. Such a heat exchanger is shown schematically in FIGS. 4 and 5.

Figure 6:
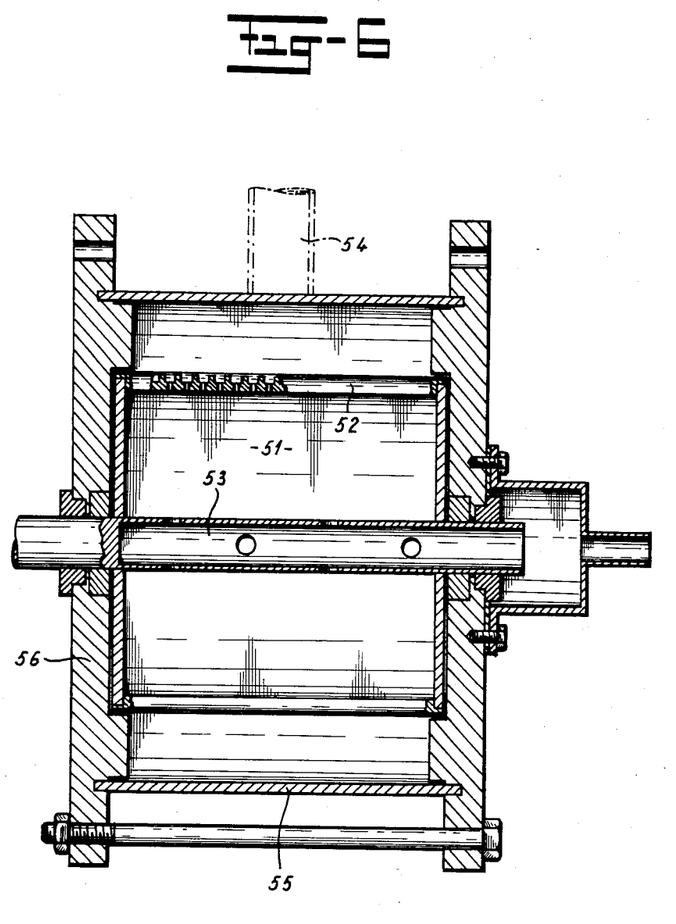
FIG. 6 is a longitudinal section of a drum filter/transporter.
Figure 7:
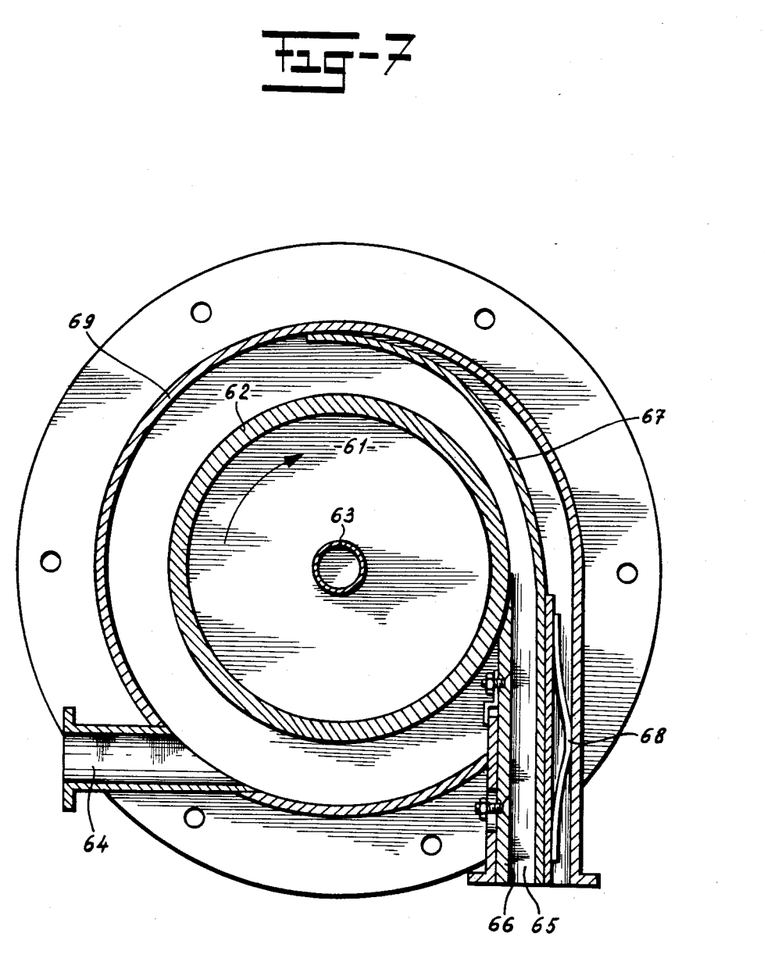
FIG. 7 is a cross section of a drum filter/transporter.

As separator/transporter, a drum filter/transporter is preferably used, as shown in FIGS. 6 and 7, together with a liquid pump for the discharge of the mother liquor and a control valve for controlling the flow of mother liquor to the desired crystallization reservoir.

If a quantity of liquid greater than or equal to the quantity of liquid adhesive to the transported crystals has to be transported to a subsequent crystallization section in the direction of the crystal transport, the transporter is installed like transporters 26 and 27 in FIG. 3. If less liquid than liquid adhesive to the transported crystals has to be conveyed, an arrangement of the transporter is used as indicated at 28.

The presence of an aging zone after the crystallization zone is desirable in many cases, but not always necessary. A well stirred cylindrical tank can be used as aging tank 24 (FIG. 3). The use of an aging tank, i.e. a reservoir in which a crystal suspension remains for some time without heat exchange occurring with the surrounding, in order to facilitate the growth of large crystals at the cost of the small ones is known per se from German "Auslegeschrift" No. 1,286,507.

As purification column 25 for pre and final purification, a column with a loosely packed crystal bed can be applied as described in Netherlands patent application No. 70,02450. In particular for the final purification also a column with a densely packed crystal bed may be used. In such a column only a limited temperature difference between top and bottom can be bridged, as otherwise the growth of the crystals in the bed will cause blockage. The pre-purification zone can be omitted when the crystals leaving the final crystallization section are sufficiently pure and the temperature difference between the crystals and the melting point of the pure material is not so great that blocking occurs when a packed crystal bed is used in the final purification zone; or when for energetic reasons the recovery of the cold content of the crystals is not considered necessary.

The crystals are melted at the bottom of the purification column in a melting circuit consisting of a circulation pump 219 and a heat exchanger 210.

The forced crystal transport in purification column 25 can be carried out with a pulsing system 211 and an expansion tank 216. By means of this pulsing system also the crystal transport from the aging tank 24 to the purification column 25 is realized.

The mixture to be treated is supplied to the crystallization cascade 21–23 at 212, and as reflux liquid to the purification column 25 at 213. The purified product is discharged at 214 and the waste product flow at 215.

Although in the drawing the purification column is shown in a vertical position and in accordance with this the terms top and bottom are used in the specification, the man skilled in the art will appreciate that the column may also be mounted in a different position, e.g. horizontally.

Figure 4:
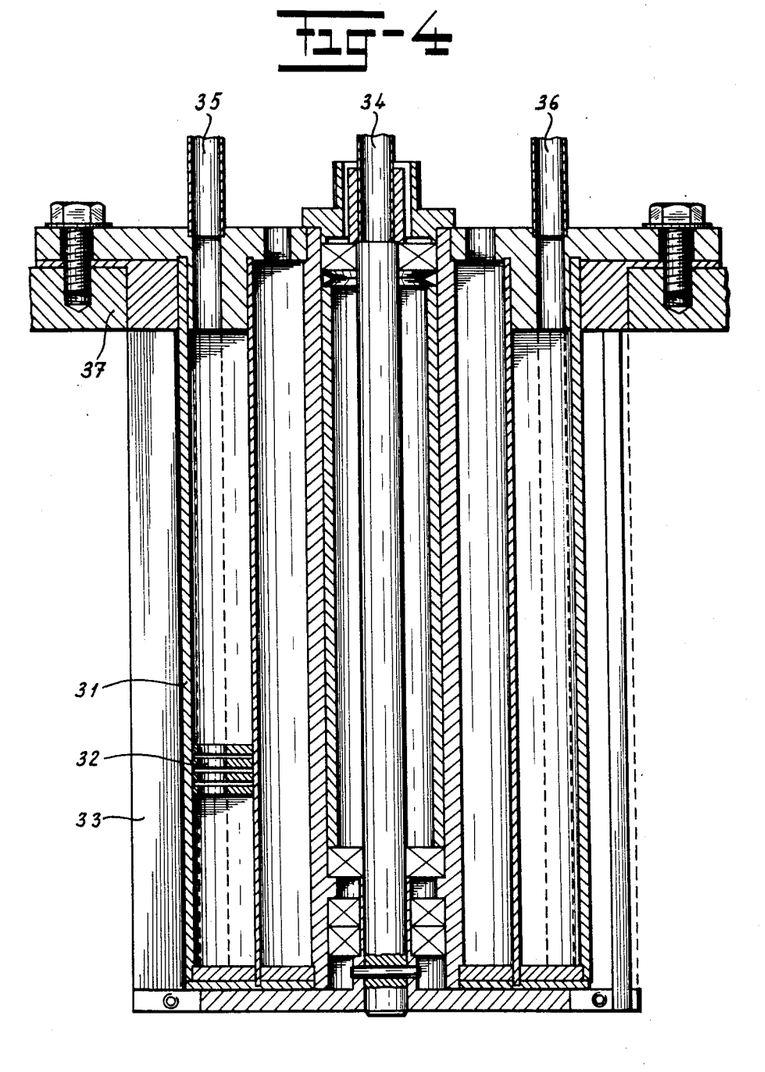
FIG. 4 is a cross section of an externally scraped cooling section.

FIG. 4 shows a cross section of an externally scraped cooling section, with a cooling wall 31, a cooling liquid circuit 32 with a big contact surface between the cooling liquid and the wall, a scraping knife 33, a drive 34 for the scraping-knife, an inlet 35 and an outlet 36 for cooling liquid, and a fixture at the wall of the crystallization reservoir 37.

Figure 5:
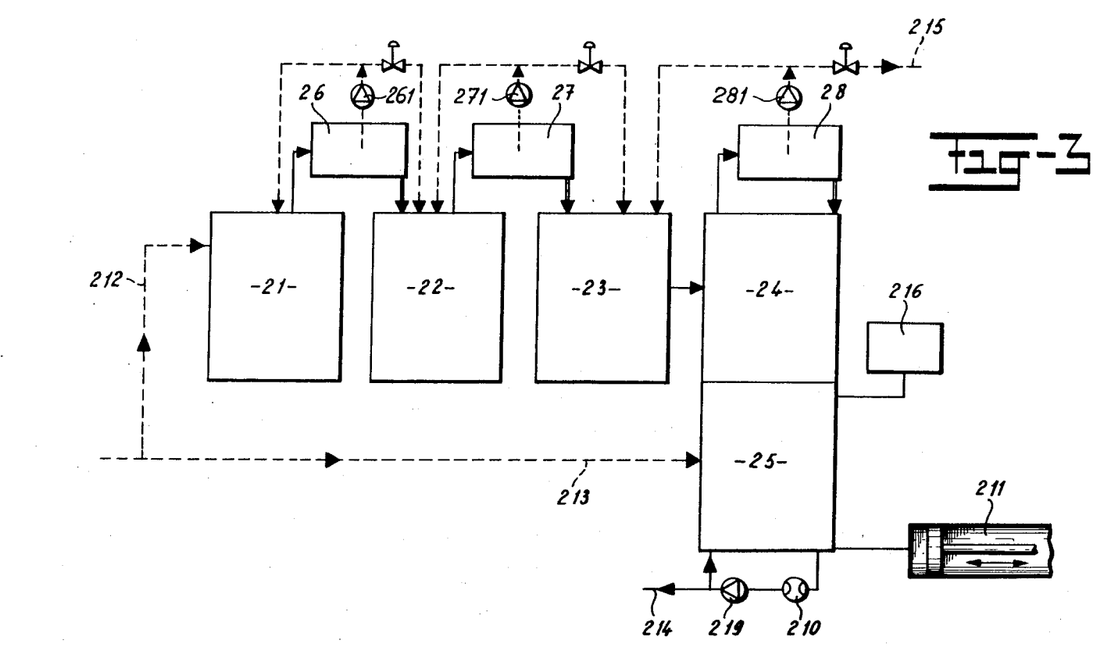
FIG. 5 is a bottom view of an externally scraped cooling section.

FIG. 5 gives a bottom view of an externally scrapped cooling section, with a cooling wall 41, a scraping-knife 42 and a drive 43 for the scraping-knife.

FIG. 6 gives a longitudinal section of a drum filter/transporter with a drum filter 51, a perforated wall of the drum filter 52, a hollow shaft 53 for removal of the mother liquor, a supply line for the crystal suspension 54, an outer cylinder 55 and side plates 56.

FIG. 7 shows a cross section of a drum filter/transporter with drum filter 61, a perforated drum filter wall 62, a hollow shaft 63 for the discharge of the mother liquor, a supply line for crystal suspension 64, a discharge opening for filtering cake 65, a scraping knife 66, a teflon lip 67 for the separation of crystals and mother liquor and for pressing the filtering cake, a spring 68 for pressing the teflon lip and an outer cylinder 69.

EXAMPLE

The purification of para-xylene was carried out in a separation installation according to FIG. 3.

This installation comprised a cascade of three crystallization sections 21, 22 and 23, an adiabatic aging tank 24, and a column for pre and final purification 25.

The crystallization sections 21, 22 and 23 each consisted of one single externally scraped and internally cooled heat exchanger as depicted in FIGS. 4 and 5, with a length of 500 mm and a diameter of 300 mm, placed in a container with a length of 600 mm and a diameter of 500 mm.

The adiabatic aging tank 24 has the same size as the crystallization tank and was well stirred.

As pre and final purification column 25, a column was used as described in Netherlands patent application No. 70,02450.

The column had a length of 1500 mm and a diameter of 500 mm.

The forced transport in the crystallization cascade was carried out with a system of drum filters/transporters according to FIGS. 6 and 7, liquid pumps and control valves.

The diameter and the length of the drum filters were both 100 mm; the rate of rotation of the drum amounted to about 60 rpm.

The feed mixture consisted of para-xylene contaminated with 20% wt ortho-xylene, meta-xylene and ethylbenzene.

The temperature in the crystallization cascade was 0° C. in crystallizer 21, −15° C. in crystallizer 22 and −30° C. in crystallizer 23.

Of the total feed of 420 kg/hour, 330 kg were introduced into crystallizer 21, while the remaining 90 kg were fed into purification column 25.

Per hour, 135 kg crystals were formed in crystallizer 21, 65 kg crystals in crystallizer 22 and 35 kg crystals in crystallizer 23.

By means of transporters 26, 27 and 28 a constant crystal fraction of 0.25 was maintained and the desired separate transports of crystals and liquid were realized.

540 kg of crystal suspension (containing 135 kg crystals) per hour was pumped from the crystallizer 21 to the transporter 26. A densified crystal mass consisting of 135 kg crystals and 90 kg adhering liquid was transported by the transporter 26 into the crystallizer 22. Pump 261 removed 315 kg liquid. Of this liquid 105 kg was fed to the crystallizer 22 and 210 kg was recycled to the crystallizer 21. From the crystallizer 22 800 kg crystal suspension (containing 200 kg crystals) was pumped to the transporter 27. A densified crystal mass comprising 200 kg crystals and 130 kg adhering liquid was fed by the transporter 27 to the crystallizer 23. Pump 271 removed 470 kg liquid which were fully recycled to the crystallizer 22.

From the aging tank, by means of pulsator 211, 235 kg of crystals per hour were fed to the purification column 25.

At the bottom of the purification column 340 kg of crystals per hour were melted, of which 300 kg per hour were removed as 99.99% pure product (para-xylene) and 40 kg per hour was returned as reflux at the bottom into the purification column.

Also a further 90 kg per hour of feed was added to the purification column.

At the top of the purification column 25 a discharge flow of 120 kg per hour was taken off. The discharge flow contained about 30% of para-xylene.

A production of 300 kg per hour yields, at 8000 labor hours per year, an annual production of 2,400 tons. With bigger devices of this type annual productions of 100,000 tons and more can be obtained.

We claim:

1. In a process for the continuous partial crystallization of a compound from a liquid mixture comprising the compound and one or more inpurities in which the mixture is fed through a cascade of a plurality of cooling sections connected in series, wherein the first cooling section has a temperature at which a portion of the compound crystallizes, each subsequent cooling section has a temperature lower than that of the preceding section, and the last section has a temperature at which the whole of the liquid mixture is not solidified, and wherein the crystals formed in each section are kept suspended in the liquid mixture such that suspension of crystals is formed, the improvement comprising separating the flow from at least one of the cooling sections other than the last section into two partial flows, a crystal flow containing substantially all of the crystals and a liquid flow containing little or no crystalline material, returning a portion of the liquid flow to the cooling section from which it was removed, whereby the volume fraction of crystals in the section to which the flow is returned is maintained at a desired level, and delivering the crystal flow and the remainder of the liquid flow to the subsequent cooling section.

2. A process according to claim 1, wherein the volume fraction of the crystals in the section to which the flow is returned is maintained at a value between 0.15 and 0.40.

3. Process according to claim 1, wherein the crystal suspension proceeding from the last section is kept resident for some time in a space were no heat exchange with the surroundings takes place.

4. A process for the separation of a compound from a liquid mixture comprising the compound and one or more impurities comprising the steps of preparing a crystal suspension of the compound from the mixture according to the process of claim 1, and separating the crystals and the liquid following the last cooling section.

5. A process for the separation of a compound from a liquid mixture comprising the compound and one or more impurities comprising the steps of preparing crystals according to the process of claim 15, and washing the crystals by contacting the crystals with a washing liquid in counter flow to form purified crystals.

6. A process according to claim 5, wherein the washing liquid is obtained by melting a portion of the purified crystals.

7. A process according to claim 6, further comprising supplying a flow of the original liquid mixture to be separated as an additional washing liquid, said flow of original liquid mixture being introduced at a point in the counter flow purification where the concentration of the compound in the crystal suspension corresponds substantially to the concentration of the compound in the original liquid mixture.

* * * * *

UNITED STATES PATENT AND TRADEMARK OFFICE
CERTIFICATE OF CORRECTION

PATENT NO. : 4,666,456
DATED : May 19, 1987
INVENTOR(S) : Thijssen et al.

It is certified that error appears in the above-identified patent and that said Letters Patent is hereby corrected as shown below:

<u>Title page, item 73</u>, "Natuurwet Enschappelijk" should read --Natuurwetenschappelijk--;

<u>First page</u>, after "Primary Examiner - David L. Lacey" insert on a new line --Attorneys - Brumbaugh, Graves, Donohue & Raymond--;

<u>Col. 2, line 33</u>, "friction" should read --fraction--;

<u>Col. 6, line 66</u>, "scrapped" should be --scraped--;

<u>Col. 8, line 51</u>, "were" should be --where--;

<u>Col. 8, line 65</u>, "15" should read --4--.

Signed and Sealed this

Twenty-second Day of December, 1987

Attest:

DONALD J. QUIGG

*Attesting Officer*    *Commissioner of Patents and Trademarks*